(12) United States Patent
Rieger et al.

(10) Patent No.: US 9,268,013 B2
(45) Date of Patent: Feb. 23, 2016

(54) METHOD FOR MEASURING DISTANCES

(75) Inventors: Peter Rieger, Grossau (AT); Andreas Ullrich, Gablitz (AT)

(73) Assignee: Riegl Laser Measurement Systems GmbH, Horn (AT)

( * ) Notice: Subject to any disclaimer, the term of this patent is extended or adjusted under 35 U.S.C. 154(b) by 296 days.

(21) Appl. No.: 13/242,446

(22) Filed: Sep. 23, 2011

(65) Prior Publication Data

US 2012/0257186 A1 Oct. 11, 2012

(30) Foreign Application Priority Data

Apr. 7, 2011 (AT) ...................................... 494/2011

(51) Int. Cl.
*G01C 3/08* (2006.01)
*G01S 7/487* (2006.01)
*G01S 17/10* (2006.01)

(52) U.S. Cl.
CPC .............. *G01S 7/487* (2013.01); *G01S 17/107* (2013.01)

(58) Field of Classification Search
CPC ......... G01C 3/08; G01S 7/487; G01S 17/107; G01S 17/89; G01S 7/483; G01S 13/106; G01S 13/12
USPC ........................................................ 356/5.01
See application file for complete search history.

(56) References Cited

U.S. PATENT DOCUMENTS

| | | | |
|---|---|---|---|
| 4,973,968 A | 11/1990 | Hurd | |
| 5,841,149 A * | 11/1998 | Spink et al. | 250/559.29 |
| 6,393,377 B1 | 5/2002 | Shirai et al. | |
| 6,836,317 B1 * | 12/2004 | Perger | 356/5.08 |
| 7,268,858 B2 * | 9/2007 | Kuijk et al. | 356/5.01 |
| 7,345,743 B1 * | 3/2008 | Hartman et al. | 356/4.01 |
| 7,405,812 B1 * | 7/2008 | Bamji | 356/5.1 |
| 7,639,347 B2 * | 12/2009 | Eaton | 356/5.1 |
| 2002/0041370 A1 | 4/2002 | Chien et al. | |

(Continued)

FOREIGN PATENT DOCUMENTS

| | | |
|---|---|---|
| DE | 19952552 | 5/2000 |
| EP | 1413896 | 4/2004 |

OTHER PUBLICATIONS

United States Statutory Invention Registration, Registration No. H548, published Nov. 1, 1988, Holliday et al.

(Continued)

*Primary Examiner* — Luke Ratcliffe
*Assistant Examiner* — Vicente Rodriguez
(74) *Attorney, Agent, or Firm* — Hoffmann & Baron, LLP

(57) ABSTRACT

A method for measuring distances of targets by measuring the time of flight of pulses, in particular laser pulses, reflected on those targets, including the steps of; transmitting pulses having a pulse interval which varies according to a modulation signal as transmitted pulses, and concomitantly recording of reflected pulses as received pulses; determining a first series of distance measurement values from times of flight between transmitted pulses and those received pulses which are respectively received within a first time window following each transmitted pulse; determining at least a second series of distance measurement values from times of flight between transmitted pulses and those received pulses which are respectively received within a second time window following each transmitted pulse; and determining that series of distance measurement values which is least affected by the modulation signal as result of the distance measurement.

29 Claims, 5 Drawing Sheets

(56) References Cited

U.S. PATENT DOCUMENTS

2004/0135992 A1* 7/2004 Munro .................. 356/4.01
2004/0181359 A1* 9/2004 Freger et al. ............. 702/149

OTHER PUBLICATIONS

International Preliminary Report on Patentability for International Application No. PCT/AT2011/000377 dated Oct. 17, 2013.

* cited by examiner

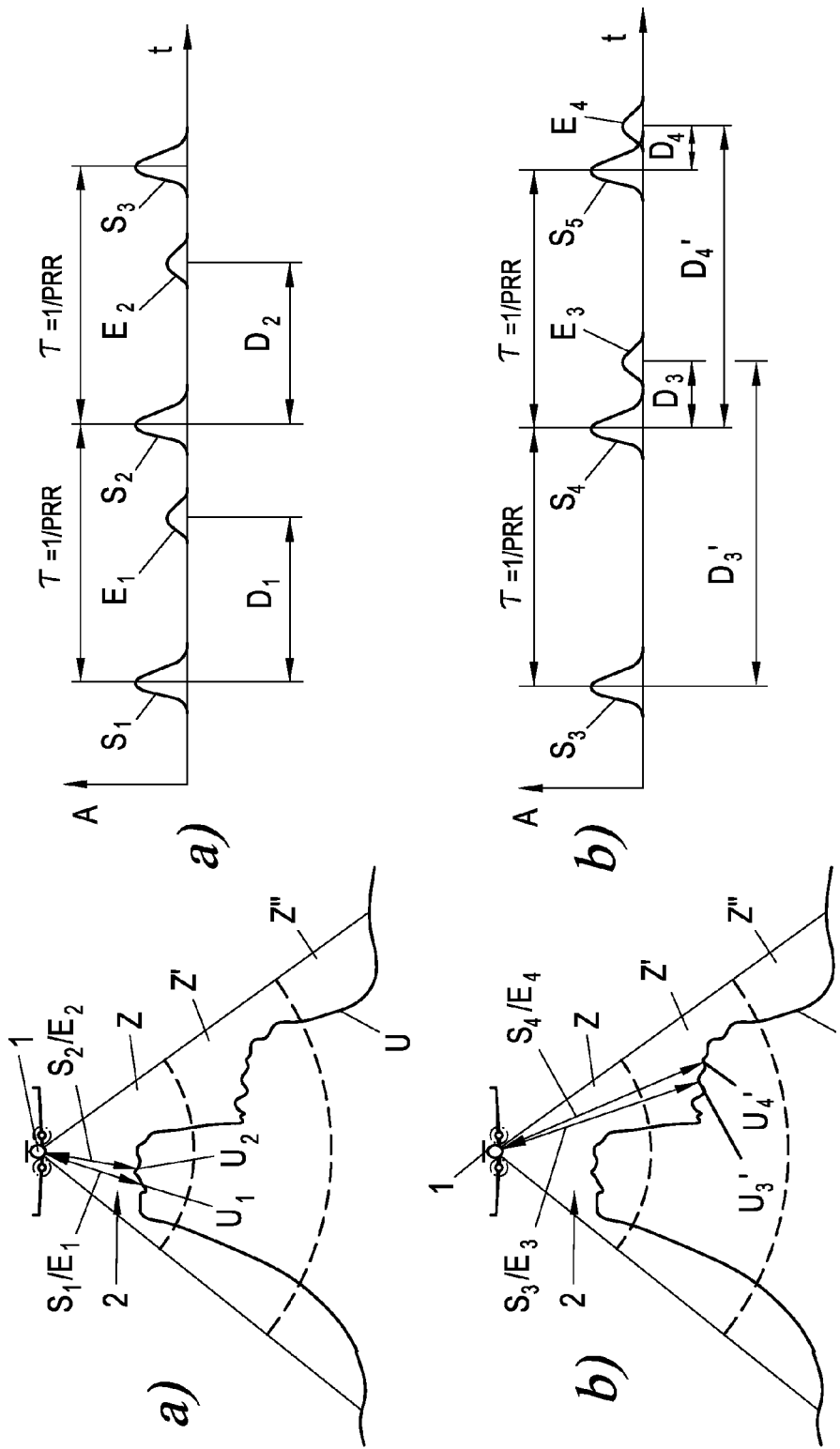

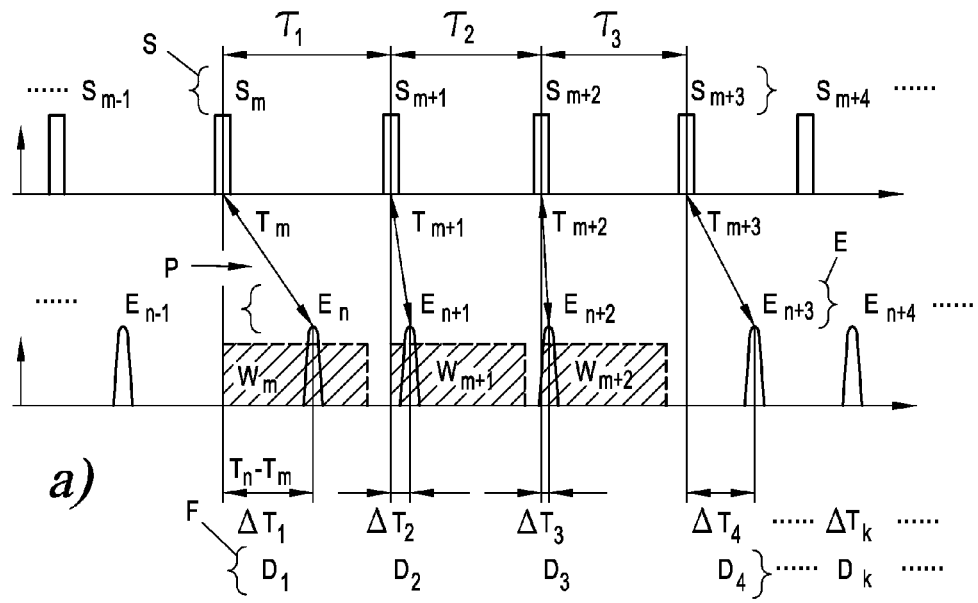
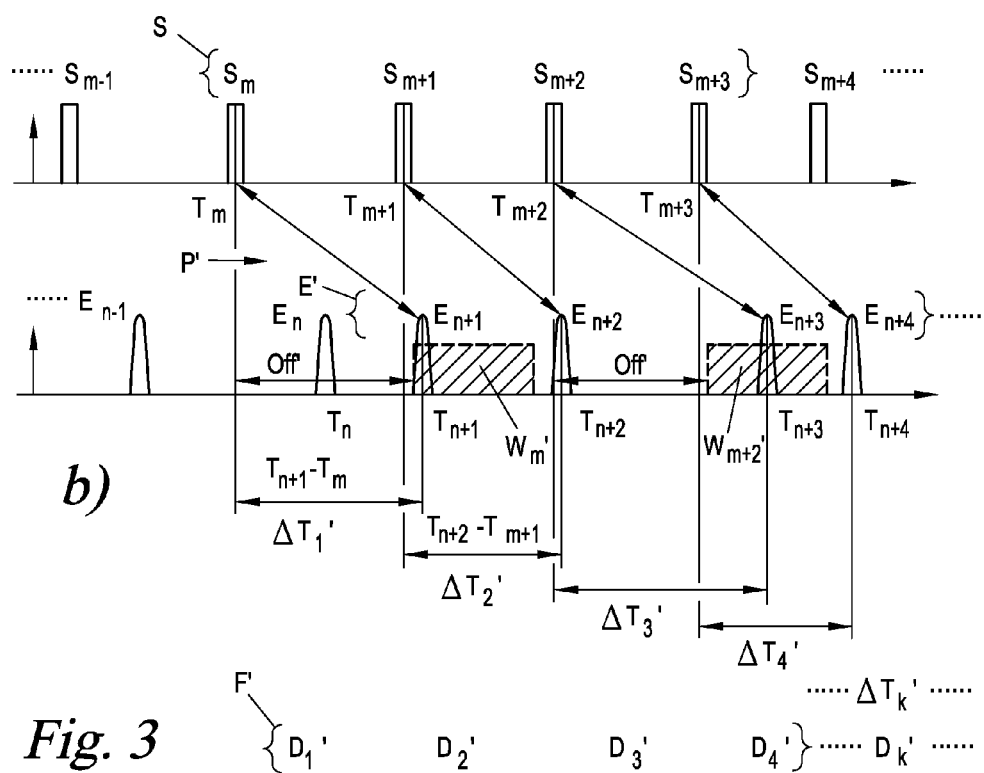
Fig. 3

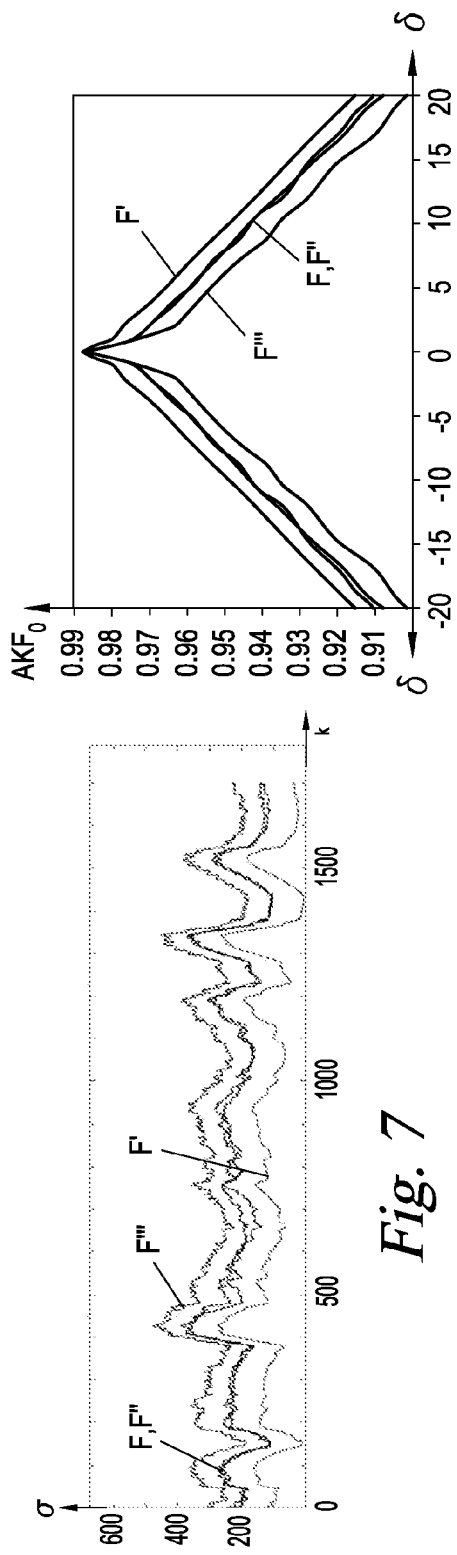
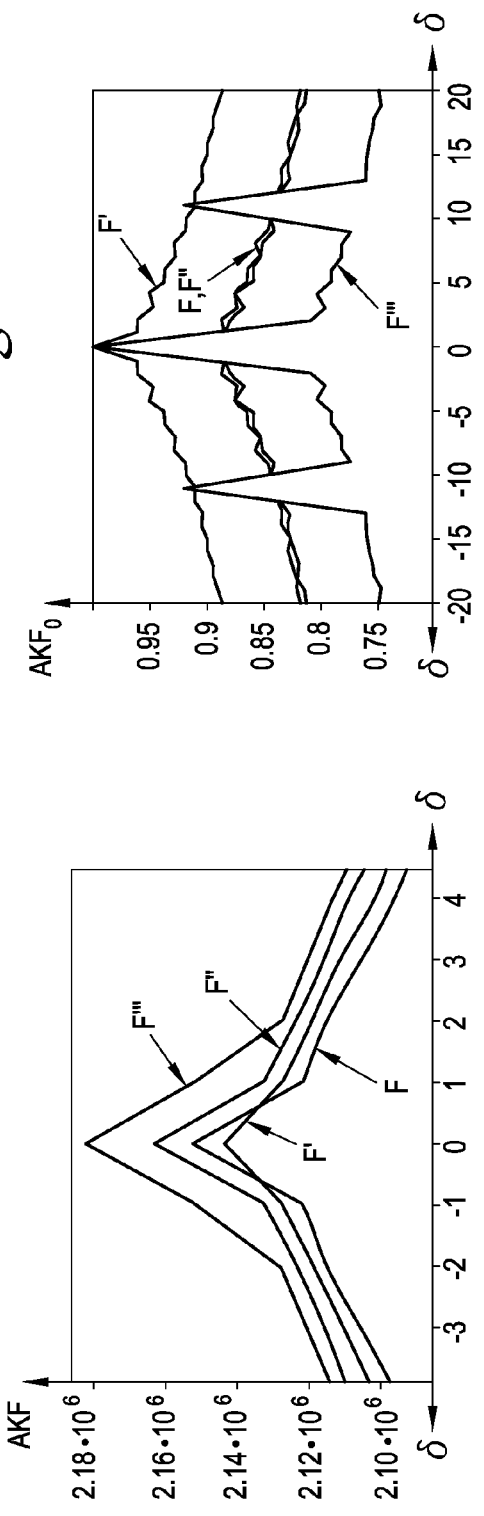
Fig. 7
Fig. 8
Fig. 9
Fig. 10

METHOD FOR MEASURING DISTANCES

CROSS-REFERENCE TO RELATED APPLICATION(S)

This application claims priority to Austrian Patent Application No. A 494/2011 filed on Apr. 7, 2011, the contents of which is hereby expressly incorporated by reference.

Copending is International Patent Application No. PCT/AT 2011/000377 filed on Sep. 15, 2011.

FIELD OF THE INVENTION

The present invention relates to a method for measuring distances of targets by measuring the time of flight of pulses reflected on those targets.

The pulses may be of any kind, e.g. light pulses, in particular laser pulses, radio pulses, in particular radar pulses, sound pulses or the like.

The present invention further relates to a method for laser scanning by progressively directing laser pulses to different targets.

BACKGROUND OF THE INVENTION

Modern pulse time-of-flight distance measuring apparatus such as laser range finders or laser scanners work at a high pulse power over large distances and/or at a high pulse repetition rate to quickly create a large number of measurement points of the environment. Both cases may result in the situation that the next pulse is already transmitted before the reflection of the last pulse was received, so that the received pulses cannot be clearly mapped anymore to their respective transmitted pulse. This is known as the "Multiple Time Around" (MTA) or "Multiple Pulses in the Air" problem. In this context, the maximum size $d_{max}$ of the range of unambiguously measurable distances, the so-called MTA zone, follows from the pulse repetition rate PRR and the speed of light c as:

$$d_{max} = c/(2 \cdot PRR).$$

Laser scanners of modern design for instance offer pulse repetition rates of up to 400 kHz, which corresponds to a MTA zone size $d_{max}$ of about 375 m. If this measuring distance is exceeded, the result of the measurement usually cannot be interpreted correctly, as the transmitted and received pulses cannot be unambiguously mapped.

FIGS. 1 and 2 show this situation in detail. An airborne laser scanner 1 emits a pulsed laser measuring beam 2 which scans an environment U having single targets (scan points) $U_1, U_2, \ldots$, e.g. fan-like line by line. Time-of-flight measurements at the single transmitted pulses $S_2, S_2, \ldots$ which are returned as received pulses $E_1, E_2, \ldots$ following the external reflection, serve to determine the distances $D_1, D_2, \ldots$ to the individual targets $U_1, U_2, \ldots$.

FIGS. 1a and 2a show an exemplary situation in the measurement of targets $U_1, U_2$ which are located in the first MTA zone Z nearest to the laser scanner 1: The received pulse $E_1$ belonging to the transmitted pulse $S_1$ is returned before the next transmitted pulse $S_2$ is transmitted in the time interval $\tau = 1/PRR$, etc.

FIGS. 1b and 2b show an exemplary situation where targets $U_3', U_4'$ are located in the second MTA zone Z': In this case, the received pulse $E_3$ belonging to the transmitted pulse $S_3$ is only received after the second transmitted pulse $S_2$ was emitted. In order to determine the correct distance $D_3'$ of the external target $U_3'$ in the zone Z', it is necessary to correctly map the received pulse $E_3$ to the transmitted pulse $S_3$; if the received pulse $E_3$ is wrongly mapped to the immediately preceding transmitted pulse $S_4$, this will result in a wrong target distance $D_3$ in the wrong MTA zone Z instead of the correct target distance $D_3'$ in the correct MTA zone Z'.

In order to correctly map the received pulses to the transmitted pulses and thus to overcome the MTA zone boundaries for achieving unambiguous distance measuring results, different methods are known in the art. A first option is to make sure in planning the measurement that all targets to be expected are located in one and the same MTA zone so that the correct mapping can be made. This method is naturally only applicable to special measurement tasks and is not suitable e.g. for highly mobile or large scale measurement or scanning tasks, e.g. the airborne scanning of mountains or the terrestrial vehicle-based scanning.

Another group of methods is based on making the individual transmitted pulses distinguishable from one another by variation of their polarization, amplitude or wavelength so that the received pulses can be mapped accordingly. However, these methods are either only suitable for just a few number of "pulses in the air" or require elaborately coded pulses, which both limits the pulse repetition rate and range of measurable distances and prolongs the time of measurement.

SUMMARY OF THE INVENTION

The present invention creates a method for measuring or scanning distances which facilitates an automatic mapping and thus a correct distance measurement of targets in any MTA zones. The method of the invention comprises: transmitting pulses having a pulse interval which varies according to a modulation signal as transmitted pulses, and concomitantly recording of reflected pulses as received pulses; determining a first series of distance measurement values from times of flight between transmitted pulses and those received pulses which are respectively received within a first time window following each transmitted pulse; determining at least a second series of distance measurement values from times of flight between transmitted pulses and those received pulses which are respectively received within a second time window following each transmitted pulse; and determining that series of distance measurement values which is least affected by the modulation signal as result of the distance measurement.

It should be noted that the variation of the pulse interval and thus of the pulse repetition rate (reciprocal of the pulse interval) is generally known as "PRR modulation" in the field of radar technology used to identify so-called "ghosting" of transmitted pulses outside the correct MTA zone.

The present invention is based on the surprising finding that by means of a signal analysis of at least two potential series of distance measurement values, as they are received for different variants of time window-recordings of received pulses, the "correct" series of distance measurement values can be automatically determined, and this by detecting the impacts of the pulse interval or PRR modulation signal in the potential series. Contrary to previously known methods, many different potential series of distance measurement values, corresponding to different MTA zone mappings, are evaluated for the initial modulation signal input.

In some embodiments, the length of the first and second time windows is approximately equal to the average pulse interval of the transmitted pulses, making the time windows covering exactly one MTA zone in each case. Further, in some embodiments the first and second time windows are offset to one another by approximately an integer multiple of the average pulse interval of the transmitted pulses, so that the measurable MTA zones can largely follow one another without any gap.

The method of the invention can be extended to any number of MTA zones by forming more than two pairings or mappings of transmitted and received pulse sequences by using more than two different time windows and accordingly generating more than two potential series of distance measurement values from which the series least affected by the modulation signal is determined. The larger the period time of the modulation signal and the more different time windows are thus made possible, the larger is the number of MTA zones that can be detected and mapped in this way. In this sense, according to some embodiments, the input modulation signal is a random signal (noise), i.e. a signal of an "infinite" period time.

Since in practice an automatic evaluation of a limited number of MTA zones is sufficient, the modulation signal may also be only a pseudorandom signal with a limited period time (pattern or code length). In some embodiments a signal suitable for this purpose is a signal based on a Barker code which shows advantageous properties for the selection of the potential series of distance measurement values.

The series of distance measurement values which is least affected by the PRR or pulse interval modulation may be determined in different ways. To this end, according to one embodiment, signal energies of the different potential series of distance measurement values are calculated, with the series having the lowest signal energy being selected. This embodiment takes advantage of the fact that a pulse interval modulation always also results in an increase of the signal energy of that series of distance measurement values which is influenced by the modulation.

A variant of this embodiment is to calculate autocorrelations of the series of distance measurement values and to select that series as the correct one which shows the highest autocorrelation. This variation is based on the finding that the least affected potential series features the biggest self-similarity (autocorrelation).

A further embodiment is to calculate cross-correlations between the potential series of distance measurement values and the modulation signal and to select the series having the lowest cross-correlation as the correct distance measurement result.

Yet another variant is to frequency-analyze the series of distance measurement values and to select the series having the smallest high-frequency components as the correct series. This variant is based on the assumption that a modulation-dependent "roughness" in the "wrong" series of distance measurement values usually has higher frequencies than the actual roughness of the measured environment has.

According to some embodiments of the invention, the method may be used for MTA-correct distance measuring of a target by directing the transmitted pulses continuously to this very same target.

According to some embodiments of the invention, the method may also be used for laser scanning by using laser pulses as transmitted pulses which are directed progressively to different targets in order to sample or scan an entire environment point by point. Laser pulses can be very easily directed to different targets using rotating mirrors or the like.

BRIEF DESCRIPTION OF THE DRAWINGS

FIG. 1 shows schematically different reflection situations of a pulsed laser scanning beam at targets located in different MTA zones according to the state of art;

FIG. 2 shows exemplary timing diagrams of transmitted and received pulses for the reflection situations FIG. 1 according to the state of art;

FIG. 3 shows exemplary timing diagrams of transmitted and received pulses in connection with different steps of the method of the invention;

FIG. 7 shows a first variant of the evaluation of the series of distance measurement values of FIG. 6 by calculating signal energies, here by means of a moving standard deviation;

FIG. 8 shows a second variant of the evaluation of the series of distance measurement values of FIG. 6 by calculating signal energies, here by means of an autocorrelation;

FIG. 9 shows a third variant of the evaluation of the series of distance measurement values of FIG. 6 by means of analyzing their autocorrelation properties; and FIG. 10 shows the variant of FIG. 9 when using a Barker code as a modulation signal instead of a noise signal.

DETAILED DESCRIPTION

Figure 4:
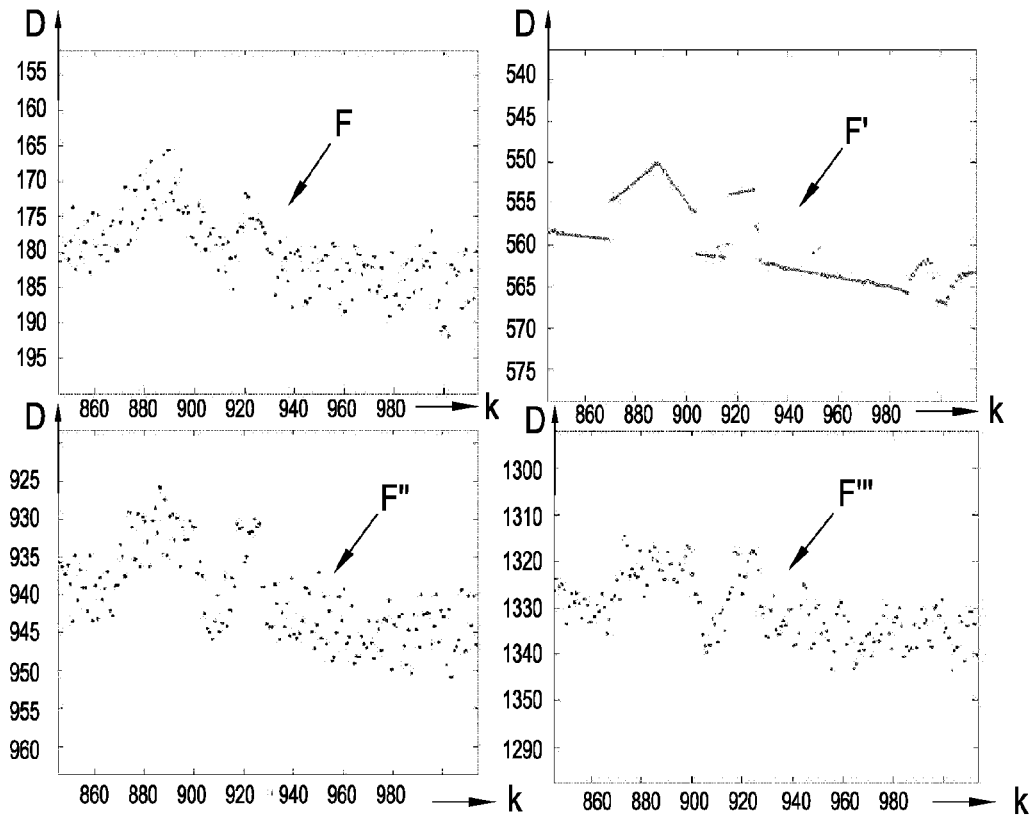
FIG. 4 shows in detail exemplary potential series of distance measurement values occurring in the course of the method of the invention.

FIGS. 1 and 2 show the problem of pulse mapping of MTA zone-crossing measurement and scanning ranges and were already discussed at the outset. This problem is overcome by means of the method hereinafter described which is based on a signal-analytical evaluation of a large number of transmitted pulses $S_1, S_2, S_3, \ldots$, generally $S_m$, and received pulse $E_1, E_2, E_3, \ldots$, generally $E_n$.

The following method description specifically refers to laser pulses as transmitted and received pulses $S_m, E_n$. However, it is understood that the transmitted and received pulses $S_m, E_n$ may be of any nature, for instance sound pulses in a sonar, light pulses in a time-of-flight camera (photonic mixing device, PMD), radar pulses in a radar range finder or scanner, electrical pulses in a line measuring instrument, etc., or just laser pulses in a laser range finder or scanner. Accordingly, the method described here can be generally applied to any kinds of pulse time-of-flight measuring methods.

According to FIG. 3a, a large number of laser-transmitted pulses $S_m$ are emitted by the laser range finder or scanner 1 into the environment U (FIG. 1), so as to get back a large number of received pulses $E_n$ through reflections of the transmitted pulses $S_m$ on environmental targets $U_i$. Based on the time of flight $\Delta T_k$ of each laser pulse reflected by the environment, i.e. the difference between the time of receipt $T_n$ of the received pulse $E_n$ and the time of transmission $T_m$ of the causal transmitted pulse $S_m$, the distance $D_k = c\Delta T_k/2$ from the range finder or scanner 1 up to the measured target $U_i$ can be calculated, as is known in the art. The times of flight $\Delta T_k$ and distance measurement values $D_k$ are directly proportional to each other and therefore are hereinafter also used synonymously and interchangeably.

On the assumption of a specific mapping ("pairing") P of a received pulse $E_n$ to a transmitted pulse $S_m$—which will be addressed in more detail later on—a time of flight $\Delta T_k$ and thus a distance measurement value $D_k$ can be calculated for every pair of transmitted pulse $S_m$ and received pulse $E_n$. In this way, a series F of distance measurement values $\{D_1, D_2, D_3, \ldots D_k, \ldots D_N\}$ can be calculated for a series S of transmitted pulses $\{S_m, S_{m+1}, S_{m+2}, \ldots, S_{m+N}\}$ and a series E of received pulses $\{E_n, E_{n+1}, E_{n+2}, \ldots, E_{n+N}\}$.

The method described here can be used for distance measurement, where the transmitted pulses $S_m$ are continuously directed to one and the same target $U_i$, as well as for scanning, where the transmitted pulses $S_m$ are progressively directed to different targets $U_i$, e.g. by scanning the environment U line by line. In the first case, a large number of distance measurement values $D_k$ of one and the same external target $U_i$ are received, which afterwards—e.g. adjusted for outliers—can be averaged so as to receive a final result of the distance D. In the second case, a discrete surface model of the environment U (a "point cloud") can be created from the large number of distance measurement values $D_k$ and the direction of transmission of the transmitted pulses $S_m$ known in the scanner 1, as is familiar to the person skilled in the art, e.g. in the field of laser scanning.

FIG. 3b shows another form of mapping or pairing P' between transmitted pulses $S_m$ and received pulses $E_n$. The mapping P' is guided by the assumption that the external targets $U_i$ are located in the second MTA zone Z' (FIG. 1)—see the exemplary targets $U_3'$ and $U_4'$. The mapping P' does not map a received pulse $E_n$ any longer to the directly preceding transmitted pulse $S_m$, but to the last but one transmitted pulse $S_{m-1}$ so as to receive a series of times of flight $\Delta T_1', \Delta T_2', \ldots \Delta T_k', \ldots$ and thus a new series F' of distance measurement values $\{D_1', D_2', D_3', \ldots D_k', \ldots, \ldots\}$ from the difference of the times of receipt and transmission $T_n - T_{m-1}$, $T_{n+1} - T_m$, etc. If the measured targets $U_i$ are located in the "correct" MTA zone Z' matching the mapping P', the series F' with the distance measurement values $D_k'$ will correctly represent their distances.

Generally, the MTA zone Z, Z', Z'', etc., where the targets $U_i$ are located, is not known. For the purpose of also identifying the correct MTA zone location and thus determining the correct distance measurement values $D_k, D_k', D_k''$, etc., in this case, the following method is applied.

As presented in FIGS. 3a and 3b, the transmitted pulses $S_m$ are not emitted with a constant pulse interval $\tau=1/\text{PRR}$, i.e. a constant pulse repetition rate PRR, but with a pulse interval varying from transmitted pulse to transmitted pulse of $\tau_1=1/\text{PRR}_1$, $\tau_2=1/\text{PRR}_2$, etc., generally $\tau_i=1/\text{PRR}_i$. In other words: the pulse repetition rate PRR or the pulse interval $\tau$ is modulated with a signal ("pulse position modulated"), so as to achieve the aforementioned variation of the pulse intervals $\tau_i$.

The variation of the pulse interval $\tau_i$ from pulse to pulse is preferably only slight, for instance +/-1%, +/-5% or +/-10% around the mean (average) pulse interval $\tau$.

The modulation signal for achieving the aforementioned pulse interval variation may be of any kind, e.g. a sinusoidal signal, triangular signal, saw tooth signal, staircase signal, a data signal with own information content, etc. The modulation signal is preferably a statistically random signal like white noise. With such a random signal, the pulse repetition rate $\text{PRR}_i$ or the pulse interval $\tau_i$ is statistically varied at random in the way of a random "phase jitter" of the transmitted pulses $S_m$. Within certain limits, such random signal may also be a merely pseudo-random signal, as is the Barker code discussed later on.

Due to the periodical or preferably random jitter of the times of transmission $T_m$ of the transmitted pulses $S_m$ caused by the modulation, different series F, F', F'', . . . , etc., of distance measurement values $D_k, D_k', D_k'', \ldots$, which are received for different mappings P, P', P'', . . . , show different properties depending on the MTA zone location Z, Z', Z'', . . . of the targets $U_i$. This is shown in FIG. 4 for four different mappings P, P', P'', P''', which have resulted in four different distance measurement values series F, F', F'', F''' of distance measurement values $D_k, D_k', D_k'', D_k'''$ each of which is shown over their order index (time index) k. In the present case, the modulation signal was a random signal (noise signal) and the targets $U_i$ were located in the second MTA zone Z'.

As can be seen from FIG. 4, the PRR or pulse interval modulation noise is reflected in all series F, F', F'', F''' except for the "correct" distance measurement values series F', i.e. the distance measurement values series F' reflecting the correct MTA zone Z' is least affected by the modulation signal. This is due to the fact that the "correct" mapping P' measures the times of flight $\Delta T_k'$ between the received pulses $E_{n+1}$, $E_{n+2}$, . . . and their causal transmitted pulses $S_m, S_{m+1}, \ldots$, regardless of the jittered phase position $T_m$ of the respective transmitted pulse, whereas the modulation-dependent phase position variations in case of "wrong" mappings P, P'', P''' result in correspondingly modulated or (here:) noisy "wrong" times of flight $\Delta T_k, \Delta T_k'', \Delta T_k'''$, etc. Thus, a signal analysis of the distance measurement values series F, F', F'', F''' can be used to detect the correct MTA zone, here Z', and thereby to automatically determine the correct distance measurement result, here F'.

Figure 5:
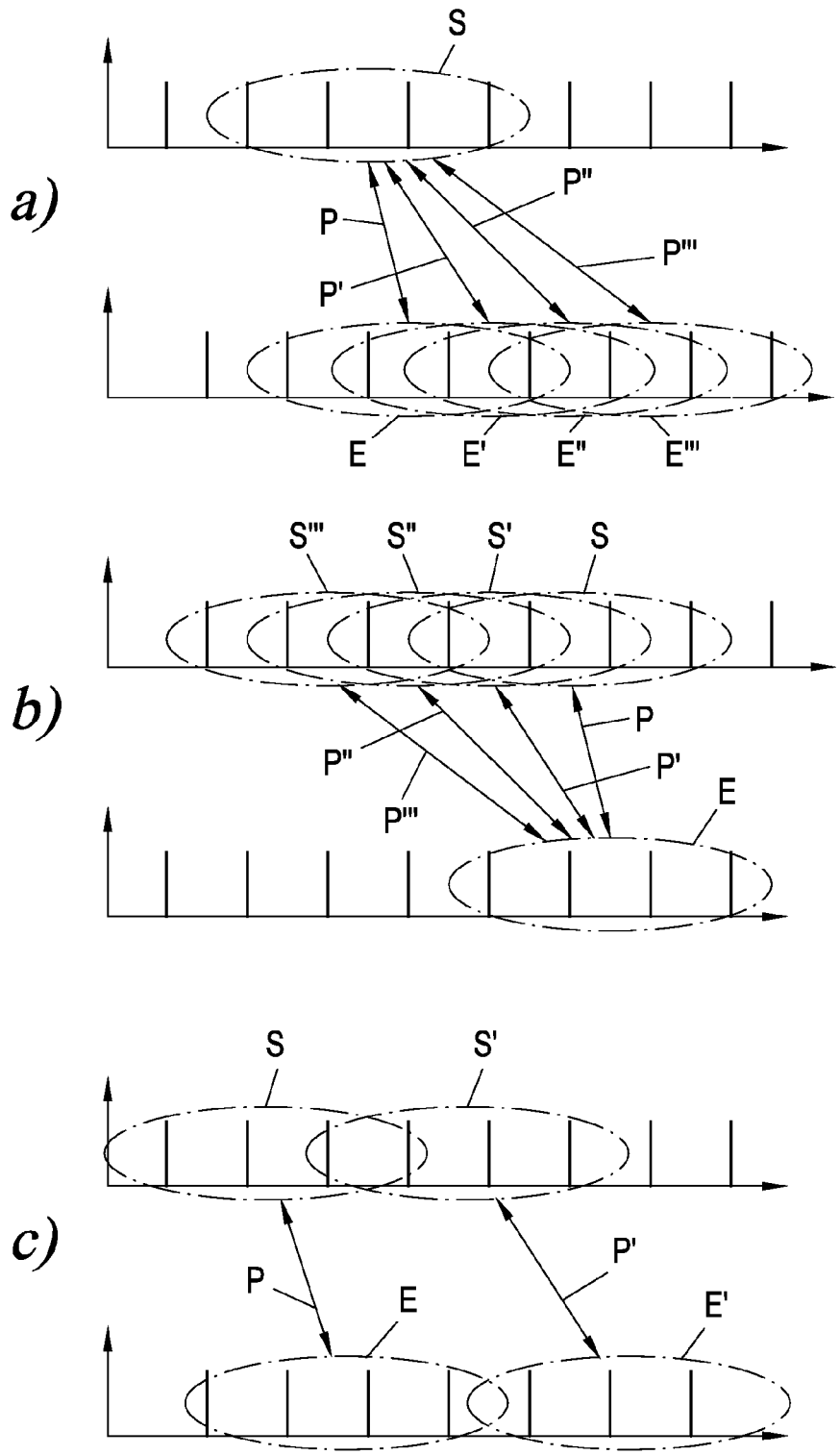
FIG. 5 shows different variants of steps of mapping between transmitted and received pulses in the course of the method of the invention.

According to FIG. 5, basically many different mappings or pairings P, P', P'', . . . may be formed to generate many different potential distance measurement values series F, F', F'', . . . as potential series for the subsequent evaluation and determination of the correct series of distance measurement values. It is irrelevant in this connection whether in each case a first series S of transmitted pulses $S_m$ is paired with many different second series E, E', E'', . . . of received pulses $E_n$—see FIG. 5—or a first series E of received pulses $E_n$ with many different second series S, S', S'', . . . of transmitted pulses $S_m$—see FIG. 5b—or generally different series S, S', S'', . . . of transmitted pulses $S_m$ with different series E, E', E'', . . . of received pulses $E_n$—see FIG. 5c. In this connection, the time offset between the series of transmitted and received pulses of a mapping P, P', P'', . . . —as explained below—determines the MTA zone Z, Z', Z'', . . . , to which the mapping applies.

Returning to FIG. 3, the mappings P, P', P'', . . . between the transmitted pulses $S_m$ and the received pulses $E_n$ can be created in the following manner. For the first mapping P those received pulses $E_n$ are taken into account and each mapped to their preceding transmitted pulse $S_m$ that were each received within a first time window $W_m$ following the respective transmitted pulse $S_m$. FIG. 3a shows an example of three first time windows $W_m, W_{m+1}, W_{m+2}$, the length of which in each case is approximately equal to the average pulse interval $\tau$ of the transmitted pulses $S_m$ and which start directly at the time of transmission $T_m$ of the respective transmitted pulse $S_m$ (or, where applicable, by a small value $\Delta$ later—see below). Thus, the times of flight $\Delta T_k$ and thus distance measurement values $D_k$ of the first series F are in each case created between a transmitted pulse $S_m$ and the next received pulse $E_n$, resulting in the mapping P for measuring the first MTA zone Z.

FIG. 3b shows as an example of two time windows $W_m'$, $W_{m+2}'$ of second time windows $W_m', W_{m+1}', W_{m+2}', \ldots$ which are offset to the first time windows $W_m, W_{m+1}', W_{m+2}', \ldots$ by approximately one average pulse interval $\tau$ of the transmitted pulses $S_m$. The second time windows $W_m', W_{m+1}', W_{M+2}', \ldots$ again have approximately the length of an average pulse interval $\tau$ and in each case start in a given offset Off' to the times of transmission $T_m, T_{m+1}, T_{m+2}, \ldots$ of the transmitted pulses $S_m, S_{m+1}, S_{m+2}, \ldots$ to which they relate. The received pulses $E_{n+1}, E_{n+2}, E_{n+3}, \ldots$ incoming in the second time windows $W_m', W_{m+1}', W_{m+2}', \ldots$ form the second series E', and the times of flight $\Delta T_k'$ regarding the aforementioned last but one transmitted pulses $S_m$, $S_{m+1}$, $S_{m+2}$, ... and thus the distance measurement values $D_k'$ form the second series F' for measuring the second MTA zone Z'.

The given offsets Off, Off', Off'', ... between the transmitted pulses $S_m$ and the start times of the time windows $W_m$, $W_m'$, $W_m''$, ... for the received pulses $E_n$ mapped to the transmitted pulses $S_m$ preferably are integer multiples of the average pulse interval τ, where applicable increased by a small Wert Δ so as to make sure that the time windows occur between the transmitted pulses $S_m$, which will eliminate interference of transmitted pulses $S_m$ on receiver electronics for the received pulses. Hence, the given offset Off for the mapping P preferably equals to 0·τ+Δ, the offset Off' for the mapping P' preferably equals to 1·τ+Δ, the offset Off'' for the mapping P'' preferably equals to 2·τ+Δ, etc.

By taking into account only those received pulses $E_n$ that fall within the respective time windows $W_m$, $W_m'$, $W_m''$, ..., gaps in the received series E, E', E'', ... attributed to transmitted pulses $S_m$ that are "lost", e.g. "swallowed" by non-reflecting targets, can be taken into account: In this case there is no received pulse $E_n$ for a transmitted pulse $S_m$ in the time window $W_m$, $W_m'$, ... under review and thus also no definable time of flight $\Delta T_k$, $\Delta T_k'$, ... and no distance measurement value $D_k$, $D_k'$, .... Such missing individual distance measurement values in the series F, F', F'', ... are not significant in the statistical evaluation of the series, i.e. they do not result in any significant impairment of the result of the evaluation.

Figure 6:
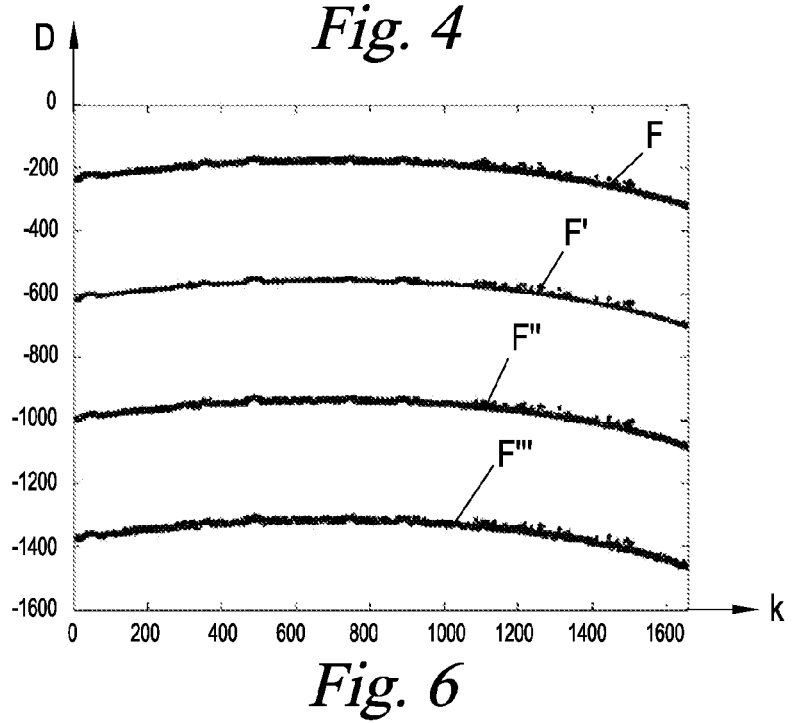
FIG. 6 shows a synopsis of the series of distance measurement values from FIG. 5 over a large number of measurement values.

FIG. 6 shows the distance measurement values series F, F', F'', F''' from FIG. 5 once more over a larger number of indices k or a longer time period in a synopsis or parallel presentation. It is again visible that the second distance measurement values series F' is least noisy, i.e. it shows the least impact by the modulation signal (here: noise).

Afterwards, every state-of-the art signal analysis method can be applied to the potential distance measurement values series F, F', F'', F''', to determine the distance measurement values series F' least affected by the modulation signal, e.g. least noisy, as the distance measurement result of the targets $U_i$. FIGS. 7 to 10 show some variants of evaluation methods suitable for this purpose.

FIG. 7 shows an analysis of the series of distance measurement values from FIG. 6 by calculating a moving standard deviation σ over a moving time window of e.g. 100 measurement values (samples). The standard deviation σ shows a mean-adjusted energy measure of the series F, F', F'', F''', with the series F' having the lowest signal energy being selected as the correct measurement result. It is understood that other energy measures than a standard deviation can also be used; the energy analysis is based on the postulate that every modulation signal fed at the beginning into the transmitted pulses $S_m$ always results in a detectable increase in energy of those distance measurement values series F, F'', F''' which are jittered by such modulation signal.

FIG. 8 shows the calculation of autocorrelation functions AKF of the distance measurement values series F, F', F'', F''' of the example from FIG. 6 over the autocorrelation offset index δ. The autocorrelation at δ=0 is again a measure for the signal energy of the series of distance measurement values, and the distance measurement values series F' showing the lowest autocorrelation AKF(δ=0) is the correct distance measurement result.

FIG. 9 shows the autocorrelation functions $AKF_0$ of the distance measurement values series F, F', F'', F''' of the example from FIG. 6 normalized to the signal energy. With a given autocorrelation offset index δ not equal to zero, e.g. δ=5, the autocorrelation of the individual series is different: The correct distance measurement values series F' is—as it is least affected by the PRR or pulse interval modulation— "most similar to itself" and thus at δ 0 shows the highest autocorrelation $AKF_0$ compared to all other "wrong" distance measurement values series F, F'', F'''.

FIG. 10 shows the same autocorrelation analysis like FIG. 9 when using a pseudo-random signal instead of a noise signal, here a Barker code of the code length 11 (+1 +1 +1 −1 −1 −1 +1 −1 −1 +1 −1), as the modulation signal. The signal separation between the autocorrelation values of the individual series is increased between the code repetition points, i.e. the multiples of code length 11. Given an autocorrelation offset δ=5 approximately located in the middle of the code length, the correct series F' can be more easily separated from the other series F, F'', F''' and detected than with the variant of FIG. 9.

A further variant of the analysis of the distance measurement values series F, F', F'', F''' is to cross-correlate each series with the modulation signal. The series having the lowest cross-correlation is that in which the modulation is least reflected and thus is the correct distance measurement result.

Yet another variant is to frequency-analyze the distance measurement values series F, F', F'', F''', for instance by means of FFT (Fast Fourier Transformation), so as to detect known frequencies of the modulation signal therein or just to determine the extent of high-frequency components in the series. The latter variant is based on the assumption that noise modulations, Barker code modulations, etc., result in increased high-frequency components in the "wrong" series of distance measurement values. The series having the lowest high-frequency components is afterwards selected as the correct distance measurement result.

The invention is not limited to the presented embodiments, but encompasses all variations and modifications falling within the scope of the appended claims.

What is claimed is:

1. A method for measuring distances of targets by measuring the time of flight of pulses reflected on those targets, comprising the steps of:

transmitting pulses having a pulse interval which varies according to a modulation signal as transmitted pulses, and concomitantly recording of reflected pulses as received pulses;

determining a first series of distance measurement values, each distance measurement value of said first series being determined from a time of flight between one of the transmitted pulses and that one of the received pulses which is received within a first time window following said transmitted pulse;

determining at least a second series of distance measurement values, each distance measurement value of said second series being determined from a time of flight between one of the transmitted pulses and that one of the received pulses which is received within a second time window following said transmitted pulse; and determining which of the first and at least second series of distance measurement values is least affected by the modulation signal as result of the distance measurement, wherein the least affected series is determined by one of the following steps:

calculating signal energies of the series and selecting the series having the lowest signal energy;

calculating autocorrelations of the series and selecting the series having the highest autocorrelation;

calculating cross-correlations of the series with said modulation signal and selecting the series having the lowest cross-correlation; and frequency-analyzing of the series and selecting the series having smallest high-frequency components.

2. The method according to claim 1, wherein the first and second time windows are approximately equal in length to an average pulse interval of the transmitted pulses.

3. The method according to claim 1, wherein the first and second time windows are offset to one another by approximately an integer multiple of an average pulse interval of the transmitted pulses.

4. The method according to claim 1, wherein the modulation signal is one of a random signal, a pseudorandom signal and a Barker code.

5. The method according to claim 1, wherein the transmitted pulses are continuously directed to the same target.

6. The method according to claim 5, wherein the transmitted pulses are laser pulses.

7. The method according to claim 1 for laser scanning, wherein the transmitted pulses are laser pulses and are progressively directed to different targets.

8. A laser distance measuring apparatus configured to implement the method of claim 6.

9. A laser scanner configured to implement the method of claim 7.

10. A method for measuring a distance to at least one target comprising:
    transmitting pulses having a pulse interval which is modulated according to a modulation signal such that the pulse interval varies from transmitted pulse to transmitted pulse;
    concomitantly recording pulses reflected by the at least one target as received pulses;
    calculating a first series of distance measurement values from times of flight between a plurality of transmitted pulses and those received pulses which are respectively received within first time windows each of which is following one of said transmitted pulses;
    calculating at least a second series of distance measurement values from times of flight between a plurality of transmitted pulses and those received pulses which are respectively received within second time windows each of which is following one of said transmitted pulses;
    determining the distance to the at least one target by determining which of the first and at least the second series of distance measurement values is least affected by the modulation signal, and
    wherein the least affected series is determined by calculating signal energies of each of the series of distance measurement values and selecting the series having the lowest signal energy.

11. The method according to claim 10, wherein the first and second time windows are approximately equal in length to an average pulse interval of the transmitted pulses, and wherein the first and second time windows are offset to one another by approximately an integer multiple of an average pulse interval of the transmitted pulses.

12. The method according to claim 10, wherein the modulation signal is one of a random signal, a pseudorandom signal and a Barker code.

13. The method according to claim 10, wherein the transmitted pulses are laser pulses and are progressively direct to different targets.

14. A method for measuring a distance to at least one target comprising:
    transmitting pulses having a pulse interval which is modulated according to a modulation signal such that the pulse interval varies from transmitted pulse to transmitted pulse;
    concomitantly recording pulses reflected by the at least one target as received pulses;
    calculating a first series of distance measurement values from times of flight between a plurality of transmitted pulses and those received pulses which are respectively received within first time windows each of which is following one of said transmitted pulses;
    calculating at least a second series of distance measurement values from times of flight between a plurality of transmitted pulses and those received pulses which are respectively received within second time windows each of which is following one of said transmitted pulses;
    determining the distance to the at least one target by determining which of the first and at least the second series of distance measurement values is least affected by the modulation signal; and
    wherein the least affected series is determined by calculating autocorrelations of each of the series of distance measurement values and selecting the series having the highest autocorrelation.

15. A method for measuring a distance to at least one target comprising:
    transmitting pulses having a pulse interval which is modulated according to a modulation signal such that the pulse interval varies from transmitted pulse to transmitted pulse;
    concomitantly recording pulses reflected by the at least one target as received pulses;
    calculating a first series of distance measurement values from times of flight between a plurality of transmitted pulses and those received pulses which are respectively received within first time windows each of which is following one of said transmitted pulses;
    calculating at least a second series of distance measurement values from times of flight between a plurality of transmitted pulses and those received pulses which are respectively received within second time windows each of which is following one of said transmitted pulses;
    determining the distance to the at least one target by determining which of the first and at least the second series of distance measurement values is least affected by the modulation signal; and
    wherein the least affected series is determined by calculating cross-correlations of each of the series of distance measurement values with said modulation signal and selecting the series having the lowest cross-correlation.

16. A method for measuring a distance to at least one target comprising:
    transmitting pulses having a pulse interval which is modulated according to a modulation signal such that the pulse interval varies from transmitted pulse to transmitted pulse;
    concomitantly recording pulses reflected by the at least one target as received pulses;
    calculating a first series of distance measurement values from times of flight between a plurality of transmitted pulses and those received pulses which are respectively received within first time windows each of which is following one of said transmitted pulses;
    calculating at least a second series of distance measurement values from times of flight between a plurality of transmitted pulses and those received pulses which are respectively received within second time windows each of which is following one of said transmitted pulses;

determining the distance to the at least one target by determining which of the first and at least the second series of distance measurement values is least affected by the modulation signal; and wherein the least affected series is determined by frequency-analyzing of the series and selecting the series having smallest high-frequency components.

17. The method according to claim 14, wherein the first and second time windows are approximately equal in length to an average pulse interval of the transmitted pulses, and wherein the first and second time windows are offset to one another by approximately an integer multiple of an average pulse interval of the transmitted pulses.

18. The method according to claim 14, wherein the modulation signal is one of a random signal, a pseudorandom signal and a Barker code.

19. The method according to claim 14 for laser scanning, wherein the transmitted pulses are laser pulses and are progressively directed to different targets.

20. The method according to claim 15, wherein the first and second time windows are approximately equal in length to an average pulse interval of the transmitted pulses, and wherein the first and second time windows are offset to one another by approximately an integer multiple of an average pulse interval of the transmitted pulses.

21. The method according to claim 15, wherein the modulation signal is one of a random signal, a pseudorandom signal and a Barker code.

22. The method according to claim 15 for laser scanning, wherein the transmitted pulses are laser pulses and are progressively directed to different targets.

23. The method according to claim 16, wherein the first and second time windows are approximately equal in length to an average pulse interval of the transmitted pulses, and wherein the first and second time windows are offset to one another by approximately an integer multiple of an average pulse interval of the transmitted pulses.

24. The method according to claim 16, wherein the modulation signal is one of a random signal, a pseudorandom signal and a Barker code.

25. The method according to claim 16 for laser scanning, wherein the transmitted pulses are laser pulses and are progressively directed to different targets.

26. A method for measuring a distance to at least one target comprising:
transmitting pulses having a pulse interval which is modulated according to a modulation signal such that the pulse interval varies from transmitted pulse to transmitted pulse;
concomitantly recording pulses reflected by the at least one target as received pulses;
calculating a first series of distance measurement values from times of flight between a plurality of transmitted pulses and those received pulses which are respectively received within a first time windows each of which is following one of said transmitted pulses;
calculating at least a second series of distance measurement values from times of flight between the same plurality of transmitted pulses and those received pulses which are respectively received within a second time windows each of which is following one of said transmitted pulses; and
determining the distance to the at least one target by determining which of the first and the at least second the series of distance measurement values is least affected by the modulation signal.

27. The method according to claim 26, wherein the first and second time windows are approximately equal in length to an average pulse interval of the transmitted pulses, and wherein the first and second time windows are offset to one another by approximately an integer multiple of an average pulse interval of the transmitted pulses.

28. The method according to claim 26, wherein the modulation signal is one of a random signal, a pseudorandom signal and a Barker code.

29. A method for measuring distances of targets by measuring the time of flight of pulses reflected on those targets, comprising the steps of:
transmitting a series of pulses having a pulse interval which varies according to a modulation signal as transmitted pulses, and concomitantly recording of reflected pulses as received pulses;
for said series of transmitted pulses, determining a first series of distance measurement values, each distance measurement value of said first series being determined from a time of flight between one of the transmitted pulses of said series of transmitted pulses and that one of the received pulses which is received within a first time window following said transmitted pulse;
for the same transmitted pulses of said series of transmitted pulses, determining at least a second series of distance measurement values, each distance measurement value of said second series being determined from a time of flight between one of the transmitted pulses of said series of transmitted pulses and that one of the received pulses which is received within a second time window following said transmitted pulse; and
determining which of the first and at least second series of distance measurement values is least affected by the modulation signal as result of the distance measurement.

* * * * *